United States Patent [19]
Fall et al.

[11] Patent Number: 5,764,863
[45] Date of Patent: Jun. 9, 1998

[54] MULTIPLE ORIGINAL COPY DATA PRINTER

[75] Inventors: Jeffrey E. Fall; Kevin C. Hess, both of Boise; Richard G. Lea, Nampa, all of Id.

[73] Assignee: Hewlett-Packard Company, Palo Alto, Calif.

[21] Appl. No.: 504,376

[22] Filed: Jul. 19, 1995

[51] Int. Cl.⁶ ............................................. G06K 15/00
[52] U.S. Cl. ................................. 395/112; 395/101
[58] Field of Search ....................... 395/112, 114, 395/117, 115, 116, 111, 106, 101, 761, 792, 505, 506, 507; 399/43, 1, 145, 130; 358/407, 468, 401, 404, 444; 400/61, 76; 347/5, 14, 142, 2, 3

[56] References Cited

U.S. PATENT DOCUMENTS

| | | |
|---|---|---|
| 4,970,554 | 11/1990 | Rourke ............................. 399/1 |
| 5,047,955 | 9/1991 | Shope et al. ....................... 395/111 |
| 5,179,637 | 1/1993 | Nardozzi ........................... 395/114 |
| 5,559,933 | 9/1996 | Boswell ............................. 395/114 |

OTHER PUBLICATIONS

Alan R. Neibauer; "Word Perfect 5.1 Tips and Tricks"; Fourth Edition; 1990; pp. 94 & 85.

*Primary Examiner*—Edward L. Coles, Sr.
*Assistant Examiner*—Dov Popovici

[57] ABSTRACT

Disclosed is a method and apparatus for printing multiple original copies from a single transmission of one copy of a document from a document generating source. The invention employs a storage device within an image forming device to make an electronic copy of the document as the document is printed the first time. The image forming device then iteratively prints the desired number multiple original copies by reading successive print jobs from the storage device.

3 Claims, 11 Drawing Sheets

Microfiche Appendix Included
(3 Microfiche, 188 Pages)

MULTIPLE ORIGINAL COPY DATA PRINTER

Incorporated herein is a microfiche appendix containing 188 typewritten pages.

BACKGROUND OF THE INVENTION

1. Technical Field

This invention generally relates to image forming devices for document generators, and more particularly, this invention relates to a multiple original copy image forming device coupled to a job source generator, such as a computer, either directly, through a network or remotely, which is capable of generating multiple copies from a single transmission of one copy.

2. Background Art

There are many electronic devices capable of generating data which needs to be printed in document form. This general class of document generators includes such devices as computers, facsimile machines, digital cameras and copiers, medical imaging devices, optical scanners, satellite imaging devices, scientific data collection devices, etc. It is common among these types of devices to employ a single processor to perform the various data collection, organization and print request functions. Unfortunately, when the processor is busy processing a print request it is unavailable for other tasks.

One example which readily demonstrates this problem is when the user of a personal computer requests multiple copies of a single document and then has to wait until the computer completes multiple print requests before he or she can again use the computer. To help combat this problem, computer application designers developed background printing which attempts to make the computer more available by processing print requests printing only during idle times for the processor. In this instance, a multipage collated document printed "n" number of times would significantly slow down foreground processing of the user's document. This implementation is a consequence of the way the command "copies=" was originally implemented on LaserJet™ printers, specifically in the printer command language (PCL), which has become an industry standard. Most users experience a noticeable decrease in the response of the computer. Additionally, when the print job is sent repeatedly over a computer network to the printer, the response time of the communications network can be noticeably affected.

Printing multiple copies of a multipage, collated document using a software application, such as a word processor, involves multiple transmissions to the printer from the application. In DOS environments, the user can suffer a significant loss of productivity due to the time taken by the application to format and print multiple jobs. Since the printer command "copies=" is page-based, not print job based, drivers were unable to provide collated multiple copies. Clever coding allowed applications to loop as many times as the number of copies. As the job consisted of back to back repeated collated pages, customers received a collated job despite the "copies=" limitations. While the coding may be clever, this still wastes network bandwidth, and in some cases, causes the print job to be processed at a rate which is significantly slower than the theoretical speed of the print engine.

Currently, the problem of requesting multiple copies of a printed job is solved in one of two ways. The first solution is to request multiple copies immediately, which means utilizing the computer and the network which connects the computer to the printer for whatever time it takes to produce the requested copies. This can take minutes, hours, or even days. The result is that while the computer, network and printer are busy, the user has to wait. Consequently, such jobs, when done, are often started after normal hours or on weekends to minimize impact to others and wasted personal time. The second solution is to print an original document and make copies on a copier. This requires the purchase, operation and maintenance of a copier, an added expense beyond that of owning a printer. Valuable time is wasted in transporting the original document to and from the copier, and extra training is required to operate the copier correctly. These jobs are also often done at night, on weekends or handed to subordinates to minimize the time impact on the document author. Additionally, the quality of the print often degrades when copies are made, and parts of the original document can be destroyed or damaged by document feeding devices, etc.

In network environments, a single computer or server is often dedicated to the task of printing. This computer is provided with printer spooler software which queues print jobs on the computer's hard drive. The individual print jobs are sent to the printer as the printer becomes available. If multiple original copies (mopies) are requested, the spooler stores the requested number of copies, each copy being essentially a separate print job. Whether on large networks, small networks or standalone computers, the storage requirements for printing multiple originals is directly proportional to the number of copies and size of the requested job. While this relieves some of the burden on the document generating computer since it does not have to wait for one mopy to print until the next is sent, it still has to send each mopy as a separate print request.

What is needed is method and/or apparatus for printing multiple original copies from a single transmission of only one copy of the document to decrease the use of network resources, computing time and storage space necessary for printing mopies.

DISCLOSURE OF THE INVENTION

This need, as well as others, is satisfied by a combination method and image forming device. For the purposes of explanation, the invention can be characterized as having three facets. The first is providing the image forming device with a local data storage memory device, preferably non-volatile, such as a hard disk. The second facet is the incorporation of firmware, or other controlling electronics into the image forming device which are configured to identify a mopy print job, copy the mopy print job to the local data storage device as the job is sent to the print engine and send "n−1" jobs to the print engine as it is available, where "n" equals the total number of mopies requested. The third facet requires the modification of the application software and printer driver, or other source document generating device, to send only a single copy print request prefaced by a command which identifies the number of mopies desired. However, the invention will allow a print request which is not prefaced by the command, to proceed in a normal fashion. In a UNIX™, DOS or Windows™ environment, the application and/or driver must provide support for the @PJL_JOB_QTY=x command, confirmation that PCL_copies=1, support for collation which in some environments may be implicit and support for the "collate=" command in PostScript™.

DETAILED DESCRIPTION OF THE INVENTION

Figure 1:
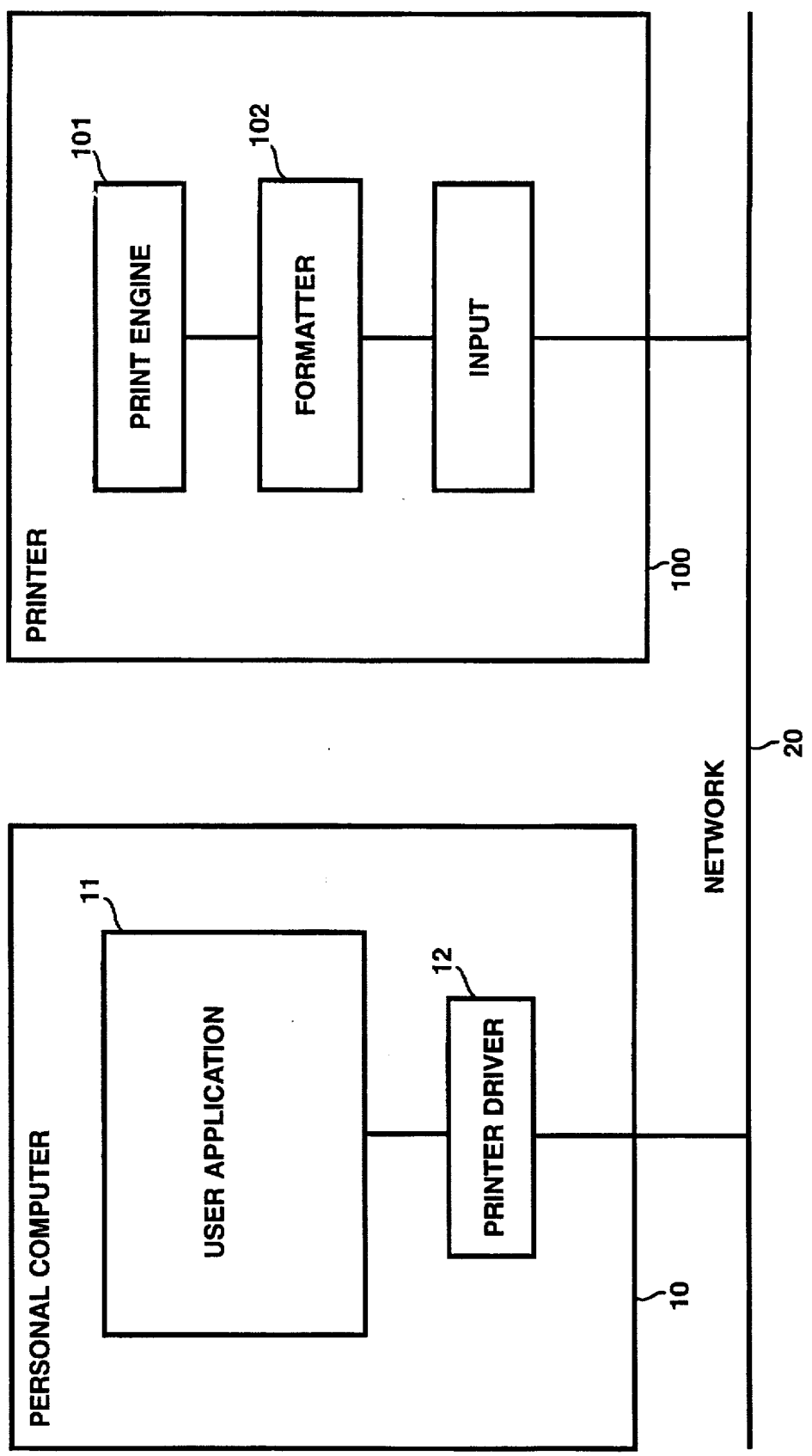
FIG. 1 is a schematic representation of a system for printing multiple original copies of a document.
Figure 2:
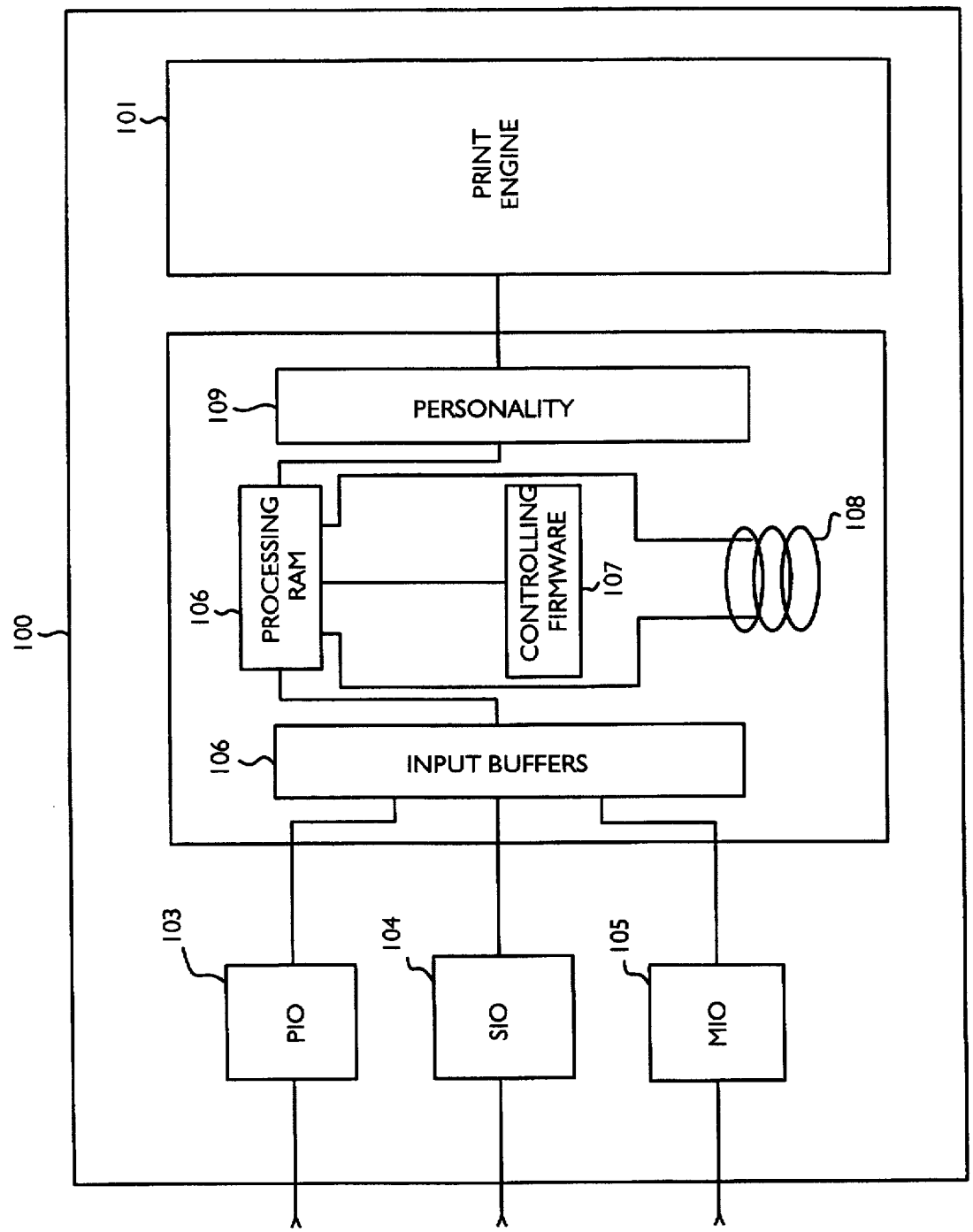
FIG. 2 is a schematic representation of a printer for printing multiple original copies of a document.
Figure 3:
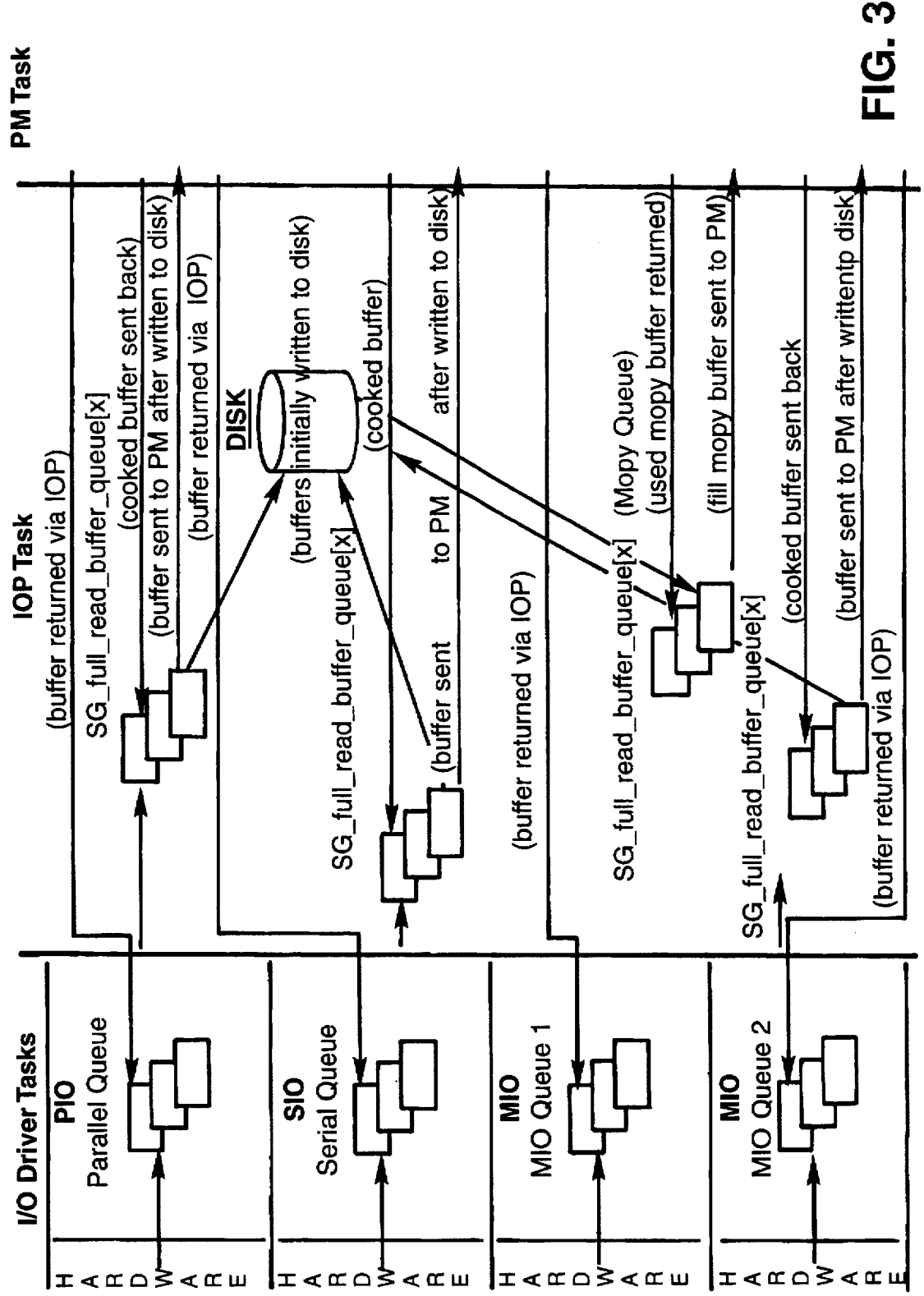
FIG. 3 is graphic representation of buffer utilization for processing by the firmware.

Referring now to the figures, the invention is shown implemented on a Hewlett-Packard Laserjet 4V™ laser printer, which is generally designated as 100 and shown in schematic form. This particular implementation is generally suitable for printer products leveraged from the i80960 firmware lineage. This particular printer was chosen because it already had a disk drive installed for local font storage. However, it is to be clearly understood that the invention is not limited to laser printers as it is equally applicable to other image forming devices such as LED printers, ink jet printers, bubble printers, impact printers, thermal printers, etc. Within the figures and in the microfiche appendix, the invention is sometimes referred to as TOPAZ, an acronym for Transmit Once, Print a Zillion.

In this particular embodiment of the invention, a personal computer 10 is connected to a printer 100 through a network 20. The connection to printer 100 could just as well be a direct connection using a parallel or serial cable or even a remote connection via a telecommunication link, an infrared link or a radio frequency link. Computer 10 has a document generating software application 11 and associated printer driver 12 in its memory. Collectively, these define one of the possible source document generators referred to earlier. As will be better understood later, the primary criteria of the source document generator is that it be configured to send a single transmission of one copy of the document prefaced with a command indicating the number of mopies desired, here the "@PJL_JOB_QTY=x" command. Software application 11 and printer driver 12 are modified such that when a user requests multiple original copies of a document, the transmission of data to printer 100 contains a single collated electronic copy of the document prefaced by the @PJL_JOB_QTY=x command, where x equals the desired number of original copies. Application 11 and printer driver 12 also need to set the variable PCL_copies to one and in a PostScript™ environment, set the collate variable to true.

In simplified and general terms, printer 100 has a print engine 101 connected to a controller or formatter 102 which receives data to be printed from the parallel input/output (PIO) port or channel 103, the serial input/output (SIO) port or channel 104 and the modular input/output (MIO) ports or channels 105. Other types of inputs, including infrared and radio frequency couples, are also compatible with the invention.

Formatter 102 includes a data storage device, here disk drive 108, associated electronics connecting the formatter to the inputs, processing electronics, random access memory (RAM) 106, read only memory (ROM) 107 and associated electronics connecting the formatter to print engine 101. The controlling software or firmware for formatter 102 resides in ROM 107, also referred to as firmware 107. A specific portion of this firmware 107 is referred to as the personality 109, which controls how the print job is rendered into a rastorized data stream. Personality 109 can, and often does, contain multiple personalities to render different kinds of print jobs. For example, often there is a separate personality for PostScript™ print jobs and a separate personality for PCL print jobs. The invention can be easily implemented in image forming devices already having a data storage device by substituting a modified ROM 107 for the existing ROM.

RAM 106 is used for several functions which can be generally categorized as buffering incoming data, mopy read/write buffering, converting the data to a rastorized output stream and buffering the rastorized data for output to print engine 101. As data is received from the input, the data is parsed to strip out printer control commands such as PCL, PJL and PostScript™ commands. These commands are used by formatter 102 to copy a mopy print job to disk 108 on its way to the personality 109, by personality 109 to render the rastorized data for print engine 101 and by formatter 102 to control print engine 101.

The software or firmware aspects of the invention are implemented in the Input Output Processing, (IOP) task of the printer firmware 107. This is a portion of the firmware which has visibility and knowledge of the input channels. All input channels, including networking cards on the MIO bus, serial and parallel channels process through the IOP task. The appendix contains the IOP task code, portions of which have been modified in accordance with the invention. The code is written in the C programming language. Most, if not all, of the invention specific code appears in bold typeface within the appendix. Large portions of the supporting firmware code were used from existing code in the Hewlett-Packard Laserjet 4V™ laser printer, which was in turn taken from similar previous products. Consequently, the code listing is a product of several authors in addition to the inventors of the invention disclosed herein. As such, comments within the code containing first person references are not in fact specific to a single person and references to specific times in the present tense are not accurate.

The code aspect of the invention consists of initialization routines, parsing routines and a state machine which coordinates the management and scheduling of buffers containing data, and control of the disk I/O subsystem. The disk I/O subsystem was originally implemented to handle PostScript™ font requirements. The invention makes use of disk I/O subsystem interface calls.

The state machine is implemented within the constraints of the message-based operating system. The desired file system operation is setup using pre-defined file system operation codes. Specific fields are set within a predefined file system structure including the address of where to read or write data and the length of the data to be read or written.

The invention functions within the constraints of existing data structures common to the IOP, PIO and MIO tasks. Queues of buffers are common. Input devices such as serial, parallel and MIO devices each maintain a number of queues. A typical I/O buffer begins life as a 1024 or 2048 byte chunk of memory allocated at task initialization. 1024 byte buffers are typically used by network MIO cards. 2048 byte buffers are used by the parallel adapter and associated task.

Figure 4:
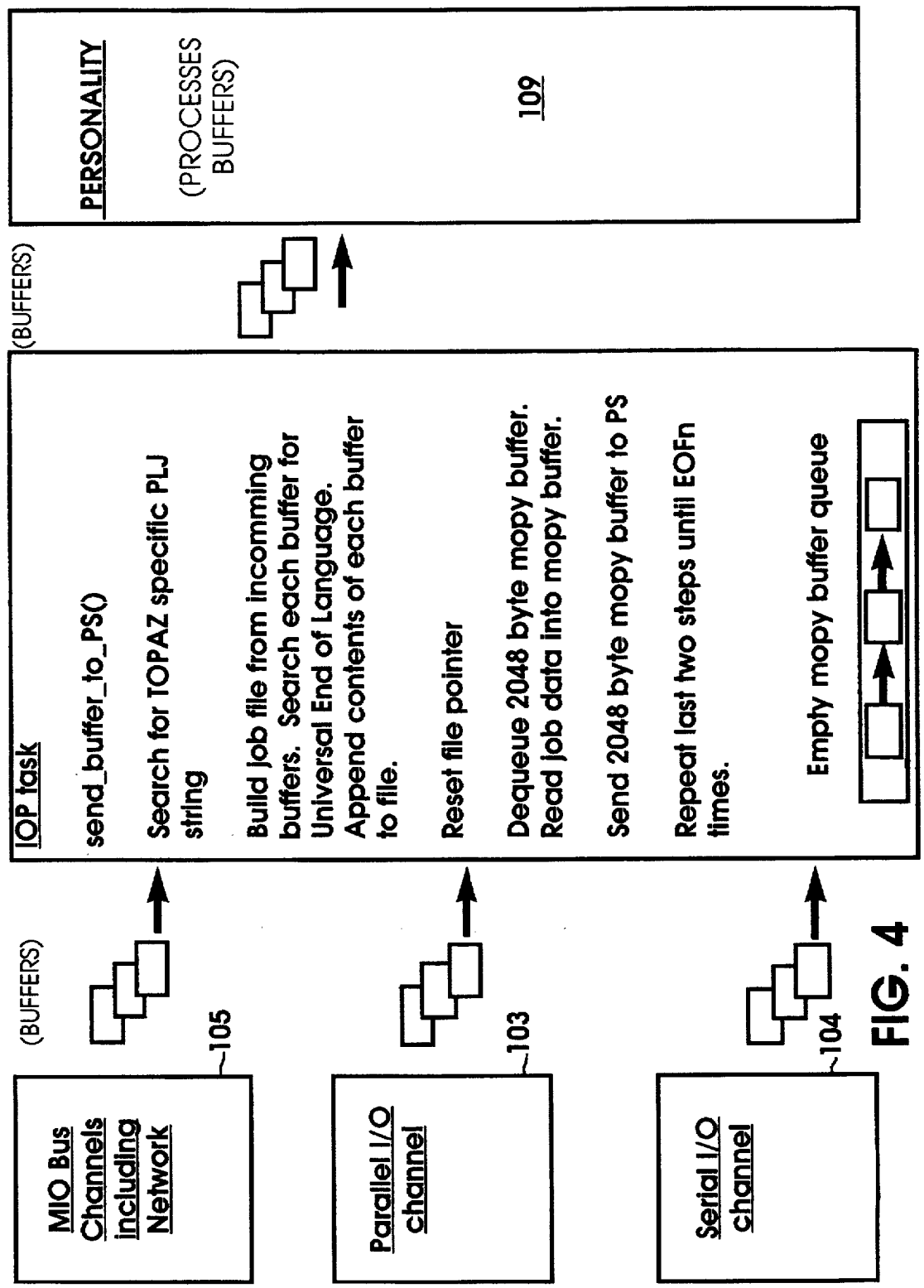
FIG. 4 is a graphic representation of the IOP Task of the firmware within which the invention in implemented.
Figure 5:
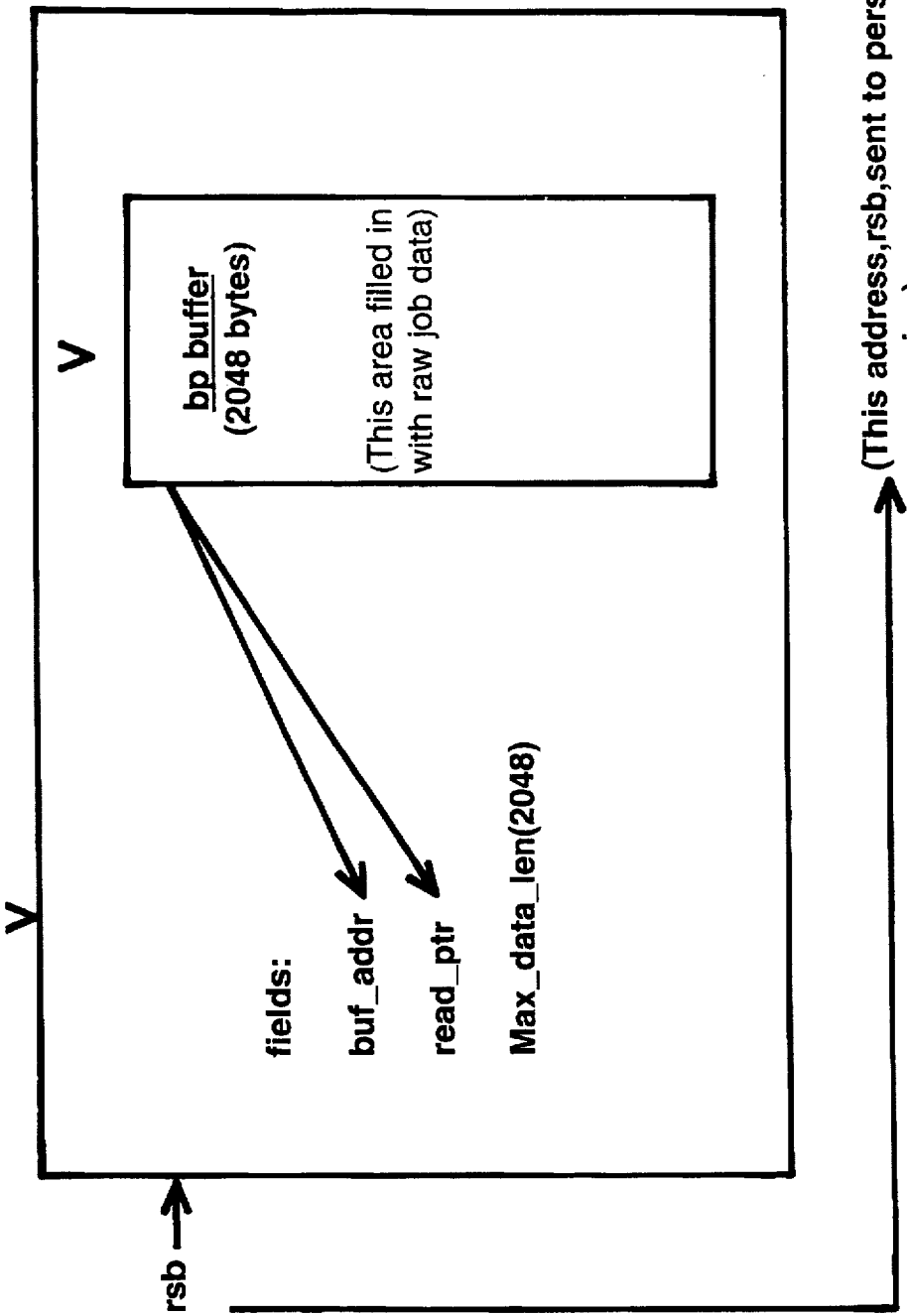
FIG. 5 is a graphic representation of buffer initialization according to the invention.
Figure 6:
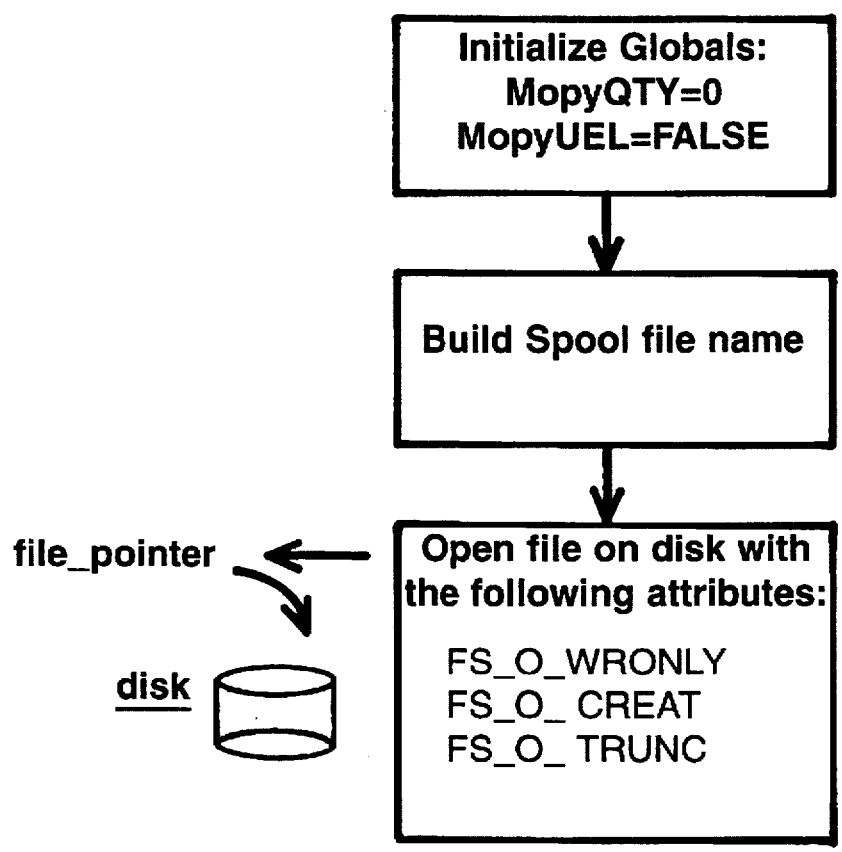
FIG. 6 is a graphic representation of disk I/O subsystem initialization by according to the invention.
Figure 7A:
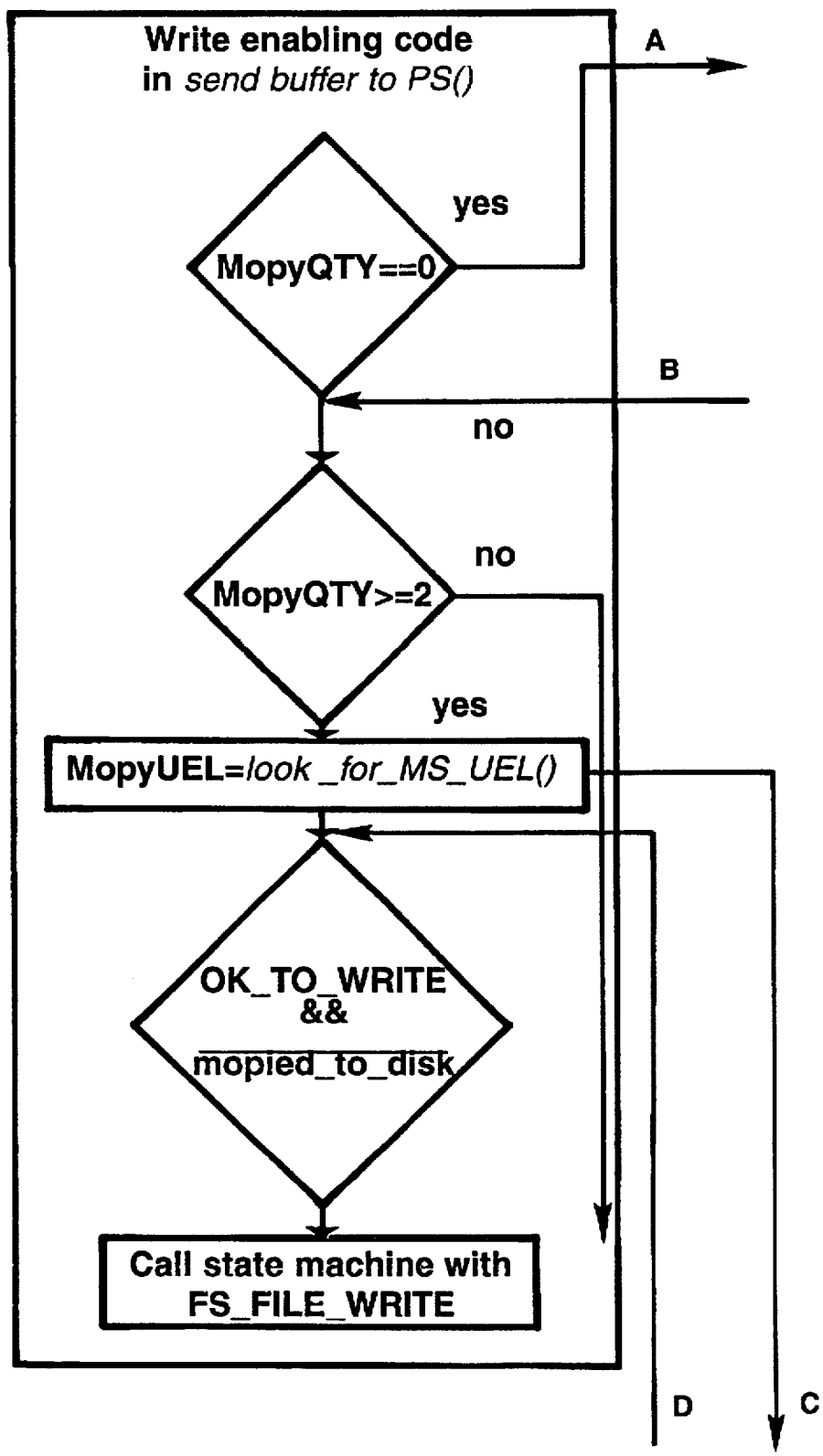
FIGS. 7A, 7B and 7C are a flow diagram of the mopy write enabling code according to the invention.
Figure 7B:
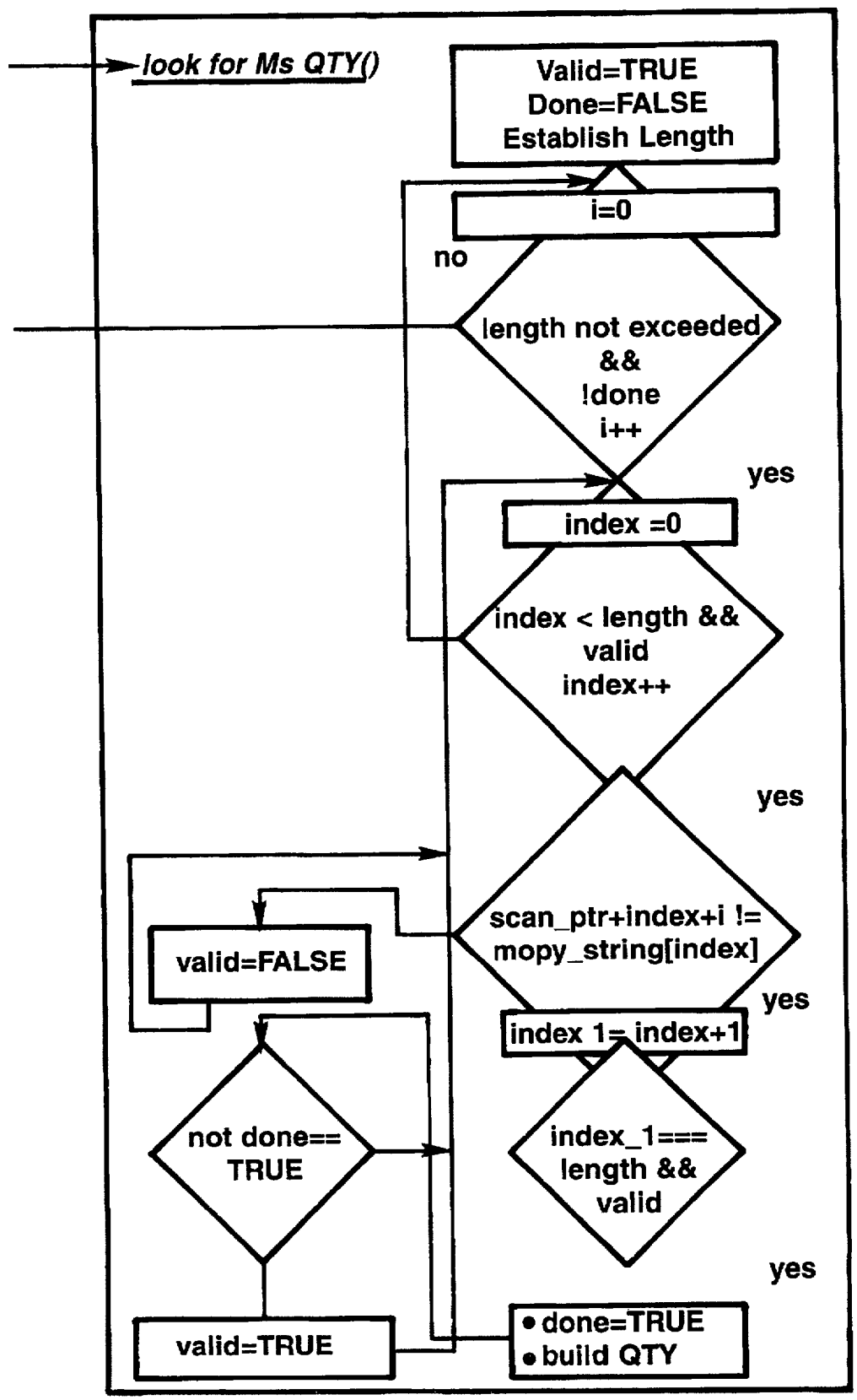
Figure 7C:
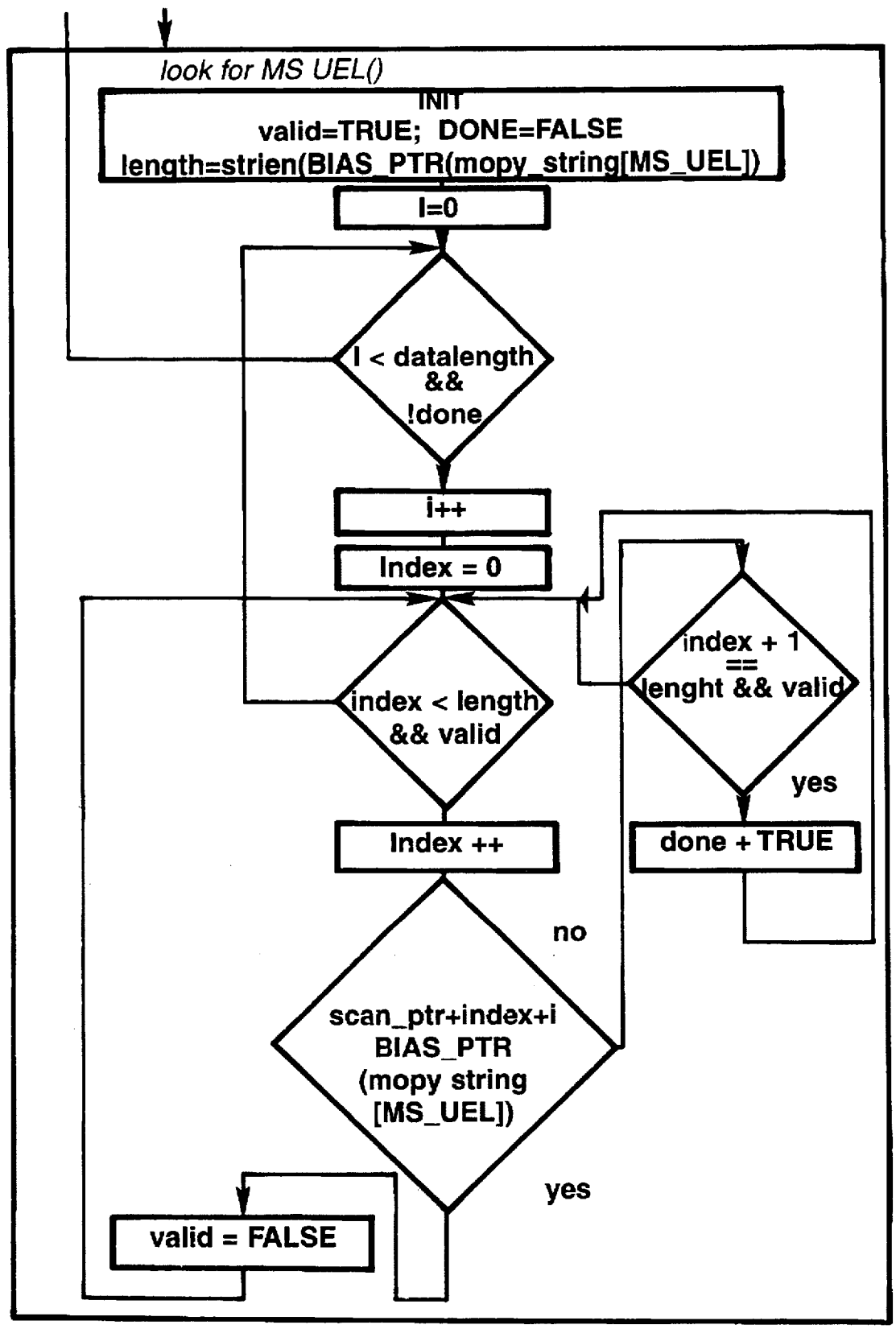
Figure 8:
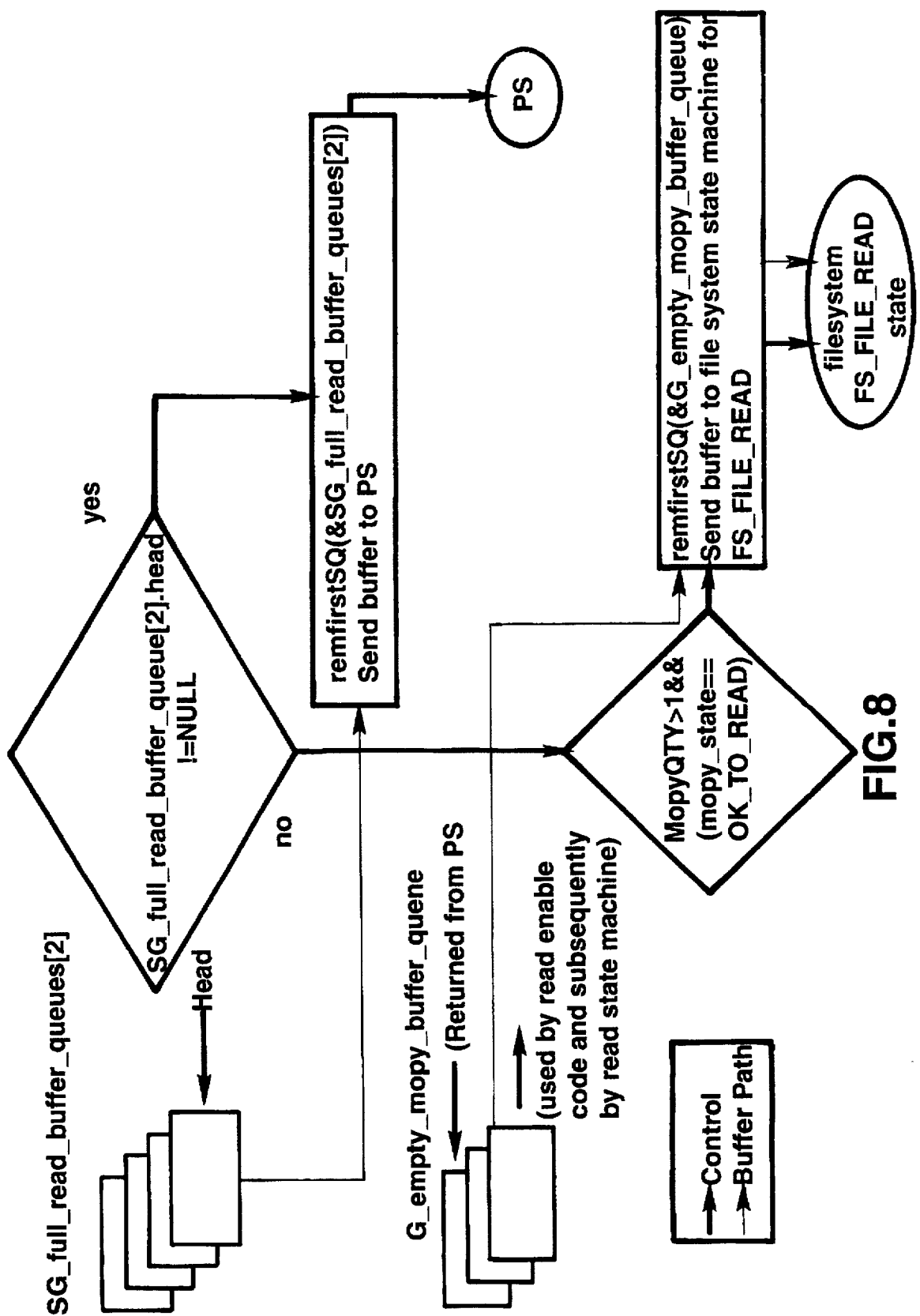
FIG. 8 is a flow diagram of the mopy read code according to the invention.

The send_buffer_to_PS function within the IOP task will be called when a channel becomes active and starts to receive data. Each buffer is parsed by searching for specific PJL commands inserted by a compliant application and driver. If a suitable string is found, state machine 110 is activated. State machine 110 will write the contents of all buffers which are subsequently sent to the send_buffer_to_PS function to disk. Each buffer is searched for the Universal End of Language (UEL) string, and when found, the state machine rewinds the file pointer on the job file and switches to the reading mode. State machine 110 then removes a 2048 byte buffer from a queue of empty mopy buffers. The empty mopy buffer is handed off to a file system read request which attempts to read 2048 bytes. When the read operation completes, the filled buffer is sent off to personality 109 for processing. Large multipage, collated print jobs will require multiple buffers to be dequeued and sent to personality 109. When personality 109 has completed processing a buffer, the buffer is returned to the IOP task and placed back on the empty mopy buffer queue. This process is repeated "n–1" times, until the number of multipage, collated copies specified by the user are printed. It is important to understand the two types of buffers used. Both types of buffers are exactly the same format and construction, and must appear the same to be usable by personality 109. The difference in buffers allows the empty buffers to be returned the their respective "home" queues, which ensures that a queue is always replenished with empty buffers. As can be seen in FIG. 4, buffers arriving into the IOP task from the MIO channel(s) 105, the parallel I/O channel 103 and the serial channel 104 are all supplied from tasks external to the IOP task. Traditionally, these buffers are simply routed through the IOP task to personality 109. The invention does not interrupt this routing, but simply copies the contents of the buffers as they are being routed to personality 109. This produces the first mopy without read disk activity. To produce the next "n–1" mopies, buffers have to be used from within the IOP task. This is the purpose of the empty_mopy_buffer_queue function. These buffers are dequeued, filled with job data from the spool file on disk and handed off to personality 109.

Firmware 107 allocates and initializes 2048 byte buffers by calling the function allocate_mopy_buffers() in the init_task() function of the IOP task. The init_task() procedure is called when the operating system initializes the IOP task. The allocate_mopy_buffers() function builds request buffers for use by state machine 110. The request buffers consist of two parts, formed by two separate calls to ALLOC8-TAGGED. ALLOC8 is a specialized form of the generic alloc() memory pool request function. The first part, the recirculating system buffer (rsb) section, is a number of fields used by the message based operating system. This buffer takes the form of a pre-defined header which is used throughout the firmware for various generic I/O applications. The second buffer is a 2048 byte section of memory used to hold actual print job data. The address of the 2048 byte buffer and its length are placed in the proper fields of the rsb buffer.

Firmware 107 initializes disk I/O subsystem operations during the printer self test procedure. The IOP task enters this phase when it receives a opOS_SELF_TEST message from the operating system. To initialize, the init_mopy() function is called. The init_mopy() function sets global variables, builds a spool file name and opens the file on disk for writing. These routines form two distinct sections within the IOP process. These consist of write and read sections. The write section, which is implemented in the routine "write_buffer", always assumes the printer is in a "normal", non-mopy state, meaning only regular jobs are sent on to the selected personality and processed. This is validated by checking the global variable Mopy Quantity, (MopyQTY). When this variable is zero, the write section parses the incoming packet for the @PJL_JOB_QTY=x command. Parsing is done by calling look_for_MS_QTY(). MopyQTY then becomes x–1 if look_for_MS_QTY() found a @PJL_JOB_QTY=x command. If MopyQTY is now greater than or equal to 2, the write section starts to check for Universal End of Language, (UEL), if it has not already been found. UEL is searched for by parsing the buffer by calling the look_for_MS_UEL() function.

The write section assumes three general states:

(1) MopyQTY==0: Buffers are not mopy type. Parse each buffer for @PJL_JOB_QTY=x command;

(2) MopyQTY==1: Job written, then erased. This is a sub-optimal initial choice and not recommended; and (3) MopyQTY>=2: Buffers are of mopy type. Call state machine to copy each buffer to file on disk. Search for UEL.

If a buffer was previously copied to disk and is returning to be "re-cooked", that is to say that it has been partially processed already, it is allowed to simply pass through without any copy action taken. This is a result of the buffer returning as a pure PCL entity after PJL commands have been stripped out.

The read section first checks the SG_read_buffer_queues[2] queue head to test if a buffer is present. If a buffer is present, a READ_ACK_MESSAGE is sent to personality 109. If a buffer is not present, and the system is processing mopies, e.g. MopyQTY>1 and the file system state is OK_TO_READ, then mopy read processing begins. A mopy buffer is dequeued from the G_empty_mopy_buffer_queue and transferred to the file system state machine with an initial state request of FS_FILE_READ. This kicks off state machine 110 which keeps calling itself to complete additional states, until the entire mopy file on disk is printed "n–1" times.

Figure 9:
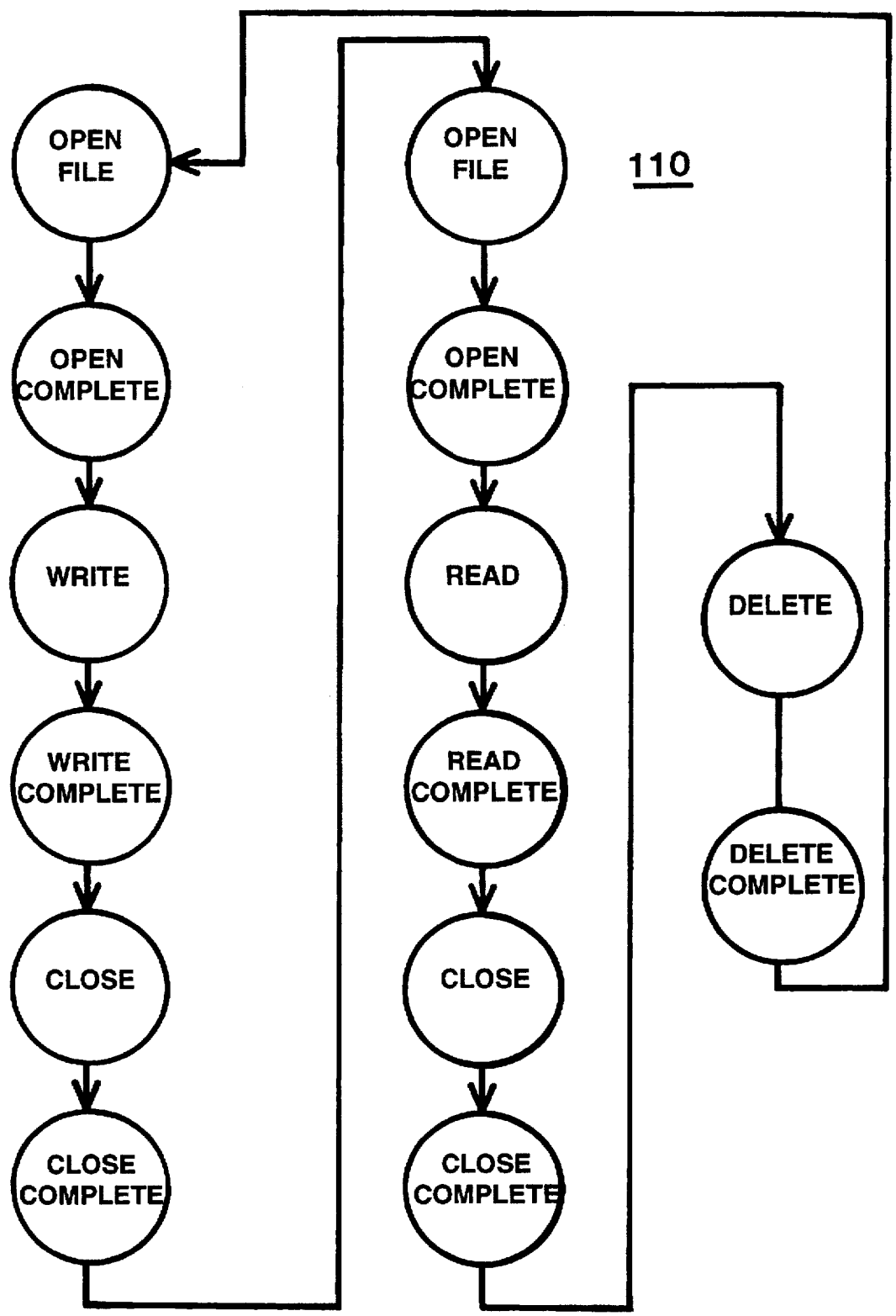
FIG. 9 is a flow diagram of the state machine according to the invention.

The remaining code is contained within state machine 110. A state machine was used because of the nature of file system operation. The operating system also supports asynchronous state operation due to its message passing nature. Typically, the IOP task receives many messages. Inside of the IOP.C code is a function called iop_task(). It contains a list of messages, which the functions within the IOP task are responsible for. The invention modifies this list of messages to include "opFS_ACTION". This message allows the file system to notify the IOP task that there is error or status information to report from the file system. Each time the file system is invoked, it eventually returns to the IOP task with the "opFS_ACTION" message. This is implemented via a large case statement. The "opFS_ACTION" section calls the state machine entry point disk_io_request(), which is similar, as it too has a list of cases for disk related operations. Each case maps to a file system return status code. Each status code can have an optional error code which may or may not occur. The state machine follows the state transition variable mopy_state. All of the states are file system operations defined by the file system. FIG. 9 is a basic flow diagram for state machine 110.

Other embodiments and modifications include using faster disk drives, flash ram, SRAM, or similar devices, to allow mopy jobs to be stored after they have been rendered so that they can then be fed directly to the print engine.

While the preferred embodiment of the invention has been described with reference having been made to a laser printer as a specific image forming device and a personal computer as a specific document generating device, it should be clearly understood that the invention is not intended to be so limited as the invention is equally applicable to other image forming devices and document generating devices with or without modification. It will therefore be understood that modifications and variations are possible without departing from the scope of the invention as expressed in the following claims.

What is claimed is:

1. An image forming device for printing a desired number of multiple original copies of a document from an electronic transmission of a single copy of the document by a source document generating device, the transmission including a command indicating the number of copies desired, where the image forming device comprises:

- an input for receiving the electronic transmission of data representing a document to be printed and the desired number of times it is to be printed;
- a controller, including a non-volatile data storage device, the controller being electrically connected to the input, the controller being configured to:
  - (i) distinguish between cases of multiple original copy (mopy) print jobs and single copy print jobs, and
  - (ii) in the case of a mopy print job, copy the data to the data storage device as the data is sent to other portions of the controller for rendering into a rasterized image, and
  - (iii) in either case render the data into a rasterized image, and
  - (iv) in the case of a mopy print job read the data copied to the data storage device and render this data into a rasterized image the desired number of times less one; and
- a print engine being connected to the controller for printing the rendered image.

2. A method for printing multiple original copies comprising the steps of:

(a) generating, using a document generating device, electronic data representing a document to be printed and prefacing the data with an electronic data command representing a desired number of original copies to be printed;

(b) receiving the data in an image forming device and analyzing it to distinguish between a first case where the data represents a multiple original copy (mopy) print job and a second case where the data represents a single copy print job;

(c) in the case of a mopy print job, copying the data to a non-volatile data storage device located within the image forming device as the data is sent to other portions of the image forming device for rendering into a rasterized image;

(d) in either case rendering the data into a rasterized image and printing the image using a print engine in the image forming device;

(e) in the case of a mopy print job reading the data copied to the storage device, rendering this data into a rasterized image and printing the image using the print engine; and (f) repeating step (e) a number of times equal to the desired number of copies less one.

3. A system for printing multiple original copies of a document comprising:

- a source document generator being configured to generate and transmit an electronic version of a document and to transmit a command indicating a desired number of copies of the document to be printed, if any;
- an image forming device capable of being communicatively coupled with the source document generator for receiving transmissions therefrom, the image forming device including
- an input for receiving the electronic transmission of a document to be printed;
- a controller, including a non-volatile data storage device, the controller being electrically connected to the input and configured to;
  - (i) distinguish between cases of mulitple original copy (mopy) print jobs and single copy print jobs, and
  - (ii) in the case of a mopy print job, copy the data to the data storage device as the data is sent to other portions of the controller for rendering into a rasterized image, and
  - (iii) in either case render the data into a rasterized image, and
  - (iv) in the case of a mopy print job read the data copied to the data storage device and render this data into a rasterized image the desired number of times less one; and
- a print engine being connected to the controller for printing the rendered image.

* * * * *